United States Patent [19]

Meyer

[11] Patent Number: 4,510,691

[45] Date of Patent: Apr. 16, 1985

[54] DEVICE FOR MEASURING DISTANCES BETWEEN TWO OPPOSITE SURFACES

[76] Inventor: Hans Meyer, Rue du Bugnon 24, 1020 Renens, Switzerland

[21] Appl. No.: 538,518

[22] Filed: Oct. 3, 1983

[30] Foreign Application Priority Data

Oct. 8, 1982 [CH] Switzerland ............ 5939/82

[51] Int. Cl.³ .............................. G01B 5/02
[52] U.S. Cl. ............... 33/169 R; 33/DIG. 8
[58] Field of Search ........... 33/125 R, 164 D, 169 R, 33/172 B, 172 E, DIG. 8

[56] References Cited

U.S. PATENT DOCUMENTS

| 2,509,986 | 5/1950 | Neff ................................ 33/172 E |
| 3,113,385 | 12/1963 | Carter ............................ 33/169 R |
| 3,368,283 | 2/1968 | Vasseur ......................... 33/169 R |
| 3,520,063 | 7/1970 | Rethwish et al. ............. 33/169 R |
| 3,812,590 | 5/1974 | Nigg et al. .................... 33/DIG. 8 |

FOREIGN PATENT DOCUMENTS 2011346 9/1970 Fed. Rep. of Germany .... 33/169 R

Primary Examiner—Richard R. Stearns
Attorney, Agent, or Firm—Emory L. Groff, Jr.

[57] ABSTRACT

The measuring device comprises a body (1) whose end (1a) is secured to a rod (2) connected to a measuring instrument. A probe assembly (3,4,5) is provided with a feeler head (4a) and is secured to a lever (6) which rotates around a pin (8) in the body (1). The angular path of the lever (6) is limited by a stop (12) built into the body (1) and by a stop adjustable by means of an eccentric part (11a) in such a manner that the body (1) always takes the same position in each measuring direction on alternate measuring of two opposite surfaces lying in the same plane. A spring (9) urges the lever (6) towards its upper position. By this means, the measurement of the distance between opposite surfaces requires no calculation, i.e. addition or subtraction of measuring constants, thus making measurement easier and precluding errors in calculations.

6 Claims, 2 Drawing Figures

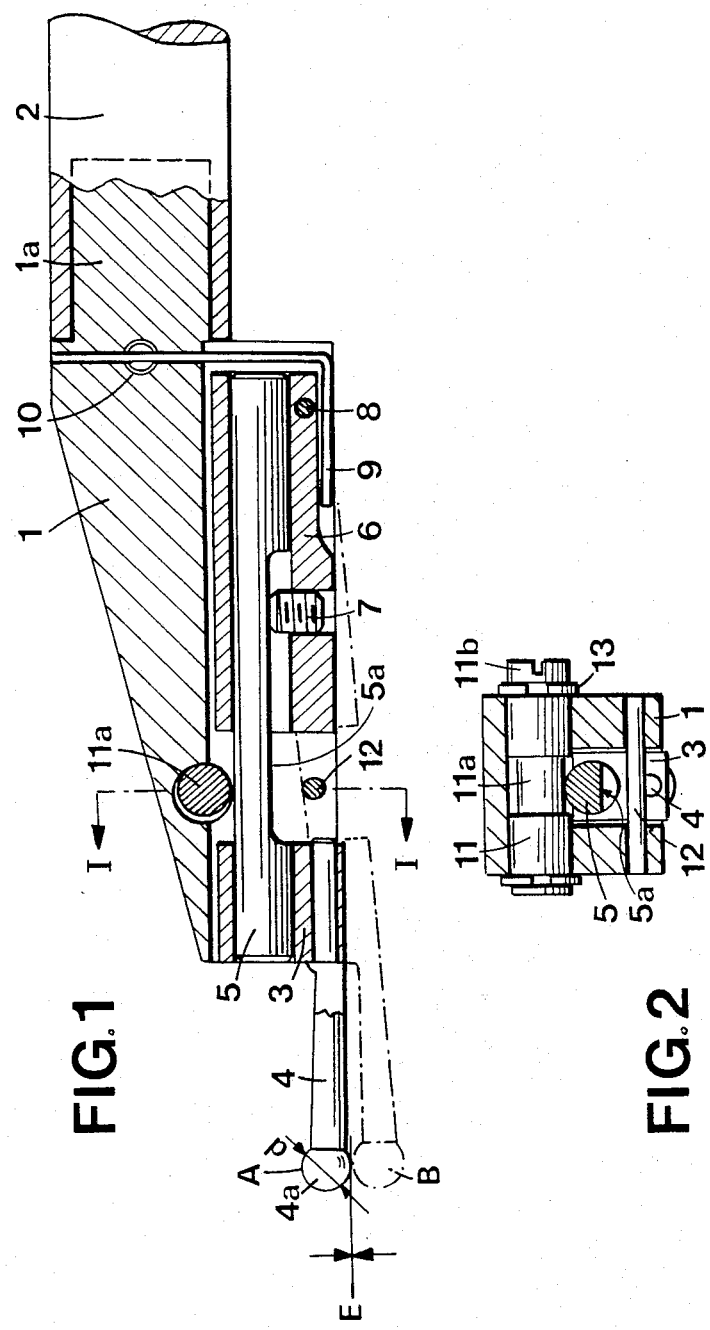

DEVICE FOR MEASURING DISTANCES BETWEEN TWO OPPOSITE SURFACES

The invention relates to a device for measuring the distance between two opposite surfaces. When measuring the distance between such surfaces with probes which are rigidly secured to the measuring instrument, a constant has to be included in the calculation of the measuring result, this constant being dependent on the diameter of the probe feeler head. If the measurement is carried out between opposite inner surfaces, the constant has to be added to the result, but if the measurement is made between outer opposite surfaces, then the constant has to be subtracted. A similar procedure is also needed when using known lever probes. The requested calculation requires time and can easily lead to errors.

The invention aims at overcoming this drawback and provides a measuring body in which a lever having a feeler head is movably supported, and wherein the lever is limited in its angular movement by stops in such a manner that the body always takes the same position in each measuring direction on alternate measuring of two surfaces facing one another and lying in the same plane. Thus on measuring the distance between opposite surfaces, all calculations are avoided, time saved and certainty guaranteed.

An embodiment of the invention is shown in FIGS. 1 and 2.

FIG. 1 shows a measuring device according to the invention in longitudinal cross-section.

FIG. 2 is a cross-section along I—I of FIG. 1.

The measuring device shown in FIGS. 1 and 2 comprises a body 1 having an end 1a secured to a rod 2. The rod 2 can be connected to a measuring instrument in a known manner.

A lever 6 is hinged on a pin 8 in the body 1 and carries a rod 5, secured by means of a screw 7. A ferrule 3 is fitted on the tip of the rod 5 and carries a probe 4 having a feeler head 4a in the form of a ball with a diameter d.

The angular movement of the lever 6 and with it the feeler head 4a is limited by two stops 11 and 12 carried by the body 1. Stop 12 is a pin inserted in the body 1, which limits the movement of the lever 6 downwards. The second stop consists of an axle 11 having an eccentric part 11a. By rotating this axle 11 by means of the slot 11b, the upper limit of the angular path of lever 6 can be adjusted.

A spring 9 is secured by means of a screw 10 in the body 1 and resiliently urges the lever 6 in the upper position.

The rod 2 is connected to a measuring instrument, and adjustment of the measuring probe is carried out by measuring a known distance between two opposite surfaces. These surfaces are measured by touching or feeling them one after the other, whereby the measurement indicator of the measuring instrument, not shown in the figures, is set at zero after the first measurement. If the correct measurement value is indicated after touching the second surface, then the measuring probe is correctly adjusted. If this is not the case, then the angular path of lever 6 should be set by means of the eccentric axle 11 until the correct distance between the two surfaces is effectively measured.

The two end positions of the feeler head 4a are shown in FIG. 1 with respect to a plane E; the lower end position (measured by touching from below) is shown in dotted outline. Whilst the upper end position is restricted by the eccentric part 11a, the lower end position is determined by the stop 12. On correct adjustment, the body 1 takes the same position on measuring the plane E from above (position A) as from below (position B) so that the same indicated measurement value at the measuring instrument (not shown) is obtained. An addition or subtraction of measurement constants is thus avoided which makes measurements easier and free of error.

The ferrule 3, the probe 4 and the rod 5 constitute together a probe assembly. By changing this probe assembly, measuring organs with different diameters and forms of the feeler head 4a can be inserted in lever 6. The rod 5 is provided with abutment means, such as stop surface 5a, cooperating with the stop 12. If the position of this stop surface 5a of the rod 5 is chosen in function of the diameter of the feeler head 4a, the angular movement of lever 6 can be controlled in such a way that the clearance between the pin 11 and the eccentric part 11a always remains the same so that different probe assemblies can be secured to lever 6 without changing the position of the stops in the body 1.

I claim:

1. A measuring device, especially for measuring the distance between opposite surfaces, comprising a body in which a lever provided with a feeler head is pivotably supported, characterized in that the angular movement of said lever is limited by stops positioned so that the body always takes the same position in each of two opposed measuring directions on alternate measuring of two surfaces facing in opposite directions and lying in the same plane.

2. A measuring device according to claim 1, wherein at least one of the angular end positions of the lever is determined by an adjustable stop.

3. A measuring device according to claim 2, wherein said adjustable stop consists of an axle comprising an eccentric part.

4. A measuring device according to claim 1, wherein said lever is urged towards a determined angular end position by a spring.

5. A measuring device according to claim 1, comprising a probe assembly having a feeler head and means for securing said probe assembly to said lever.

6. A measuring device according to claim 5, comprising a plurality of probe assemblies having feeler heads of different diameters, said probe assemblies comprising abutment means cooperating with said stops, the position of said abutment means being dependent on the diameter of the feeler head so that said probe assemblies can be interchanged without affecting the position of the stops in the body.

* * * * *